(12) United States Patent
Roessler et al.

(10) Patent No.: US 8,718,246 B2
(45) Date of Patent: May 6, 2014

(54) PROVIDING A ROSTER AND OTHER INFORMATION BEFORE JOINING A PARTICIPANT INTO AN EXISTING CALL

(75) Inventors: Frank M. Roessler, Warren, NJ (US); Mehmet C. Balasaygun, Freehold, NJ (US); Birgit A. Geppert, Warren, NJ (US); Trung T. Dinh-Trong, Bedminster, NJ (US)

(73) Assignee: Avaya Inc., Basking Ridge, NJ (US)

( * ) Notice: Subject to any disclaimer, the term of this patent is extended or adjusted under 35 U.S.C. 154(b) by 26 days.

(21) Appl. No.: 13/355,113

(22) Filed: Jan. 20, 2012

(65) Prior Publication Data
US 2012/0128140 A1 May 24, 2012

Related U.S. Application Data

(63) Continuation-in-part of application No. 12/623,427, filed on Nov. 22, 2009.

(51) Int. Cl.
*H04M 11/00* (2006.01)

(52) U.S. Cl.
USPC .................... 379/93.21; 379/158; 379/202.01

(58) Field of Classification Search
USPC ................................. 379/93.21, 158, 202.01
See application file for complete search history.

(56) References Cited

U.S. PATENT DOCUMENTS

| | | | |
|---|---|---|---|
| 6,631,258 B1 | 10/2003 | Chow et al. | |
| 6,747,685 B2 | 6/2004 | Taib et al. | |
| 6,959,074 B2 | 10/2005 | Berstis | |
| 7,266,189 B1 | 9/2007 | Day | |
| 2003/0195930 A1* | 10/2003 | Henrikson et al. | 709/205 |
| 2007/0104180 A1 | 5/2007 | Aizu et al. | |
| 2007/0288562 A1 | 12/2007 | Shaffer et al. | |

(Continued)

FOREIGN PATENT DOCUMENTS

WO    WO 2006/128171    11/2006

OTHER PUBLICATIONS

Schulzrinne "Personal Mobility for Multimedia Services in the Internet," IDMS 96 (European Workshop on Interactive Distributed Multimedia Systems and Services), Berlin, Germany, Mar. 4-6, 1996, pp. 1-18.

(Continued)

*Primary Examiner* — Alexander Jamal
(74) *Attorney, Agent, or Firm* — Sheridan Ross P.C.

(57) ABSTRACT

A communication manager establishes a call between two or more participants on two or more communication devices. The call can be an audio or video call. A call request is sent from one of the communication devices to conference an additional communication device to the call. For example, a participant in the call decides to conference an additional person to further discuss an idea.

An information manager gets a roster of the participants. In addition to the call request, the roster of the participants is sent to the additional communication device. The additional communication device receives the call request and the roster. The roster is displayed to the user of the additional communication device. The user can then indicate to answer the call request. If answered, the additional communication device sends an indication that the call was answered and the additional communication device is conferenced into the call.

19 Claims, 5 Drawing Sheets

(56) References Cited

U.S. PATENT DOCUMENTS

| | | | |
|---|---|---|---|
| 2008/0016156 | A1 | 1/2008 | Miceli et al. |
| 2009/0086943 | A1 | 4/2009 | Jain et al. |
| 2009/0239502 | A1 | 9/2009 | Dempo et al. |
| 2009/0282103 | A1* | 11/2009 | Thakkar et al. ............... 709/204 |
| 2009/0323919 | A1 | 12/2009 | Toner et al. |
| 2011/0044440 | A1 | 2/2011 | Balasaygun et al. |
| 2012/0143605 | A1* | 6/2012 | Thorsen et al. ............... 704/235 |
| 2012/0300914 | A1 | 11/2012 | Baccay |

OTHER PUBLICATIONS

Extended European Search Report with Search Opinion for European Patent Application No. 10190302.9, dated Jul. 6, 2011 6 pages.

Official Action for U.S. Appl. No. 12/623,427, mailed Oct. 2, 2012 11 pages.

Extended Search Report for European Patent Application No. 12185547.2, dated May 2, 2013 6 pages.

Official Action for U.S. Appl. No. 12/623,427, mailed Mar. 21, 2013 13 pages.

* cited by examiner

PROVIDING A ROSTER AND OTHER INFORMATION BEFORE JOINING A PARTICIPANT INTO AN EXISTING CALL

CROSS-REFERENCE TO RELATED APPLICATIONS

This Continuation-in-Part Application filed under 37 CFR §1.53(b) claims the benefit under 35 U.S.C. §120 to U.S. patent application Ser. No. 12/623,427, filed Nov. 22, 2009, entitled "SENDING A USER ASSOCIATED TELECOMMUNICATION ADDRESS," which is incorporated herein by reference.

TECHNICAL FIELD

The system and method relates to identification of participants in a call and in particular to identifying a participant whose call is part of an existing call.

BACKGROUND

One of the advantages of caller ID is that when someone calls, the called party is able to know who is calling. This allows the called party to make a better decision on whether to answer the call. For example, if the called party knows that the calling party is someone important, the called party is likely to answer the call. On the other hand, if the calling party is someone who the called party may not want to talk to, the called party may be less likely to answer the incoming call. The ability to screen calls based on who is calling is ubiquitous in today's telephony systems.

However, the caller ID model breaks down if the calling party is part of a prior call or involved in a conference call. For example, if Joe and Sally are engaged in a call and Sally calls Ted to conference Ted into the call, Ted will only receive the caller ID of Sally. Ted does not know that Joe is also one of the calling parties. In this example, the called party is not provided the full list of who is actually calling. What is needed is a solution that identifies all the calling parties who are part of an incoming call. This allows the called party to screen these types of calls in the same way they can screen a call from a single party.

SUMMARY

The system and method are directed to solving these and other problems and disadvantages of the prior art. A communication manager establishes a call between two or more participants on two or more communication devices. The call can be an audio or video call. A call request is sent from one of the communication devices to conference an additional communication device to the call. For example, a participant in the call decides to conference an additional person further to discuss an idea.

An information manager gets a roster of the participants. In addition to the call request, the roster of the participants is sent to the additional communication device. The additional communication device receives the call request and the roster. The roster is displayed to the user of the additional communication device. The user can then indicate to answer the call request. If answered, the additional communication device sends an indication that the call was answered and the additional communication device is conferenced into the call.

In addition to the roster, information that describes the call can also be sent. For example, a name of a presenter on the call can be sent. Other information can include a description of the call, a recorded message, a link to a web conference, a copy of an invite to the call, a document, and a ring tone. The information can also include information that describes the call that is taken from a calendar event in a calendaring system. The information can be specific to a participant, such as a title or a preference for a specific type of communication or medium. The information can also identify groups to which participants on the call belong. For example, participants from a specific company can be identified.

In addition to identifying participants on a conference, other types of devices can also be identified. For example, if the call is being recorded, the roster can include the recorder. Other types of devices/software can include key word detectors or a gesture recognition system.

When the roster and/or information are received at the additional communication device, the roster is displayed in a list or icon that the users can drag-n-drop onto a call metaphor that represents an existing call or a call acceptance. The call metaphor may display all the participants on the call as the call is being established.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
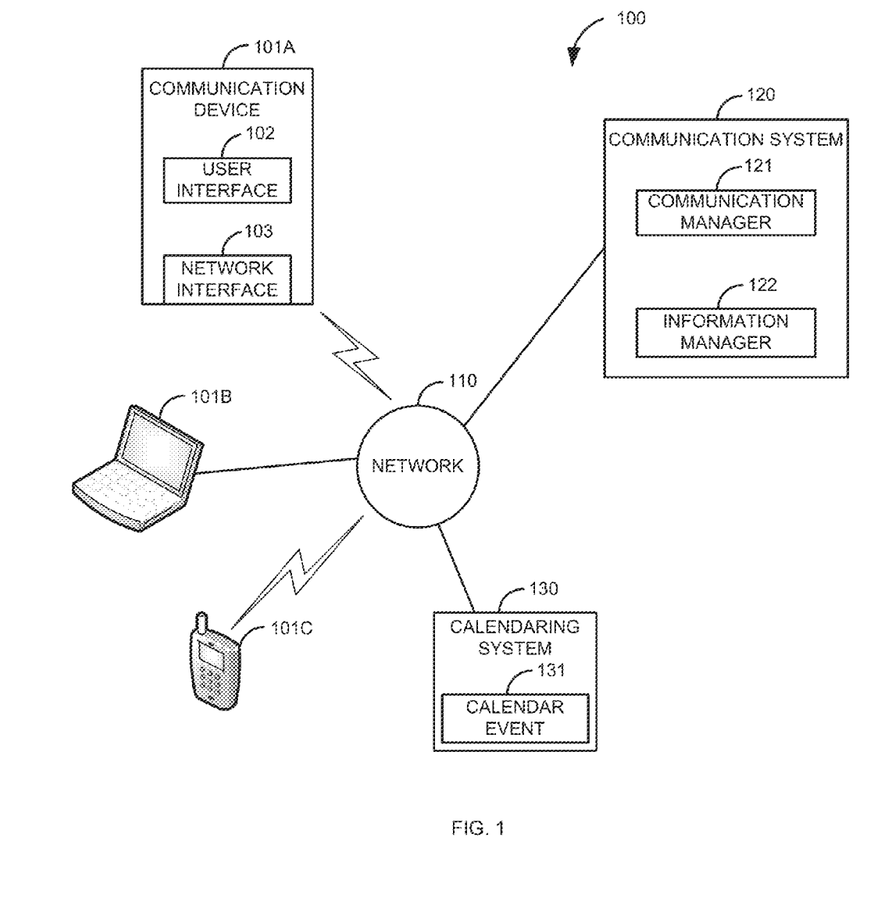
FIG. 1 is a block diagram of a first illustrative system for providing a roster and other information before joining a participant to a call.

FIG. 1 is a block diagram of a first illustrative system 100 for providing a roster and other information before joining a participant to a call. First illustrative system 100 comprises communication devices 101A-101C, network 110, communication system 120, and calendaring system 130.

Communication devices 101A-101C can be any type of device that can communicate on network 110, such as a Personal Computer (PC), a laptop computer, a cellular telephone, a tablet device, a telephone, a smart phone, a Personal Digital Assistant (PDA), and the like. Communication device 101A further comprises user interface 102 and network interface 103. User interface 102 can be any type of interface that allows a user to access/control communication device 101A. For example, user interface 102 can comprise a touch screen, a Liquid Crystal Display (LCD), a plasma display, a Cathode Ray Tube (CRT), a mouse, a trackball device, a joystick, a combination of these, and the like. Network interface 103 can be any hardware/software that allows communication device 101A to communicate on network 110. For example, network interface 103 can be a cellular interface, a wireless interface (e.g., 802.11G), an Ethernet interface, a modem, an Integrated Services Digital Network (ISDN) interface, and the like. Although not shown, communication devices 101B-101C can also comprise some type of user interface 102 and network interface 103. In this exemplary embodiment, there are three communication devices 101A-101C shown. However, any number of additional communication devices 101 can be connected to network 110.

Network 110 can be any network that can send and receive audio and/or video streams, such as the Internet, a Wide Area Network (WAN), a Local Area Network (LAN), the Public Switched Telephone Network (PSTN), a packet switched network, a circuit switched network, a cellular network, a corporate network, a combination of these, and the like. Network 110 can use a variety of protocols, such as Ethernet, Internet Protocol (IP), Session Initiation Protocol (SIP), Integrated Services Digital Network (ISDN), H.323, H.264, H.263, VC-1, and the like.

Communication system 120 can be any hardware/software that can manage communications, such as a switch, a router, a Private Branch Exchange (PBX), a telephony system, a video server, an audio conferencing system, a video conferencing system, a proxy server, any combination of these, and the like. Communication system 120 further comprises communication manger 121 and information manager 122. Communication manager 121 can be any hardware/software that can manage communications between communication devices 101A-101C. Communications can be audio, video, and/or text communications. Communication manager 121 may manage, mix, and/or route audio/video conferences. Information manager 122 can be any hardware/software that can manage information, such as a database, a storage server, a processor/memory, any combination of these, and the like.

Calendaring system 130 can be any calendaring system that can manage calendars, such as a Simple Mail Transfer Protocol (SMTP) server, Microsoft Outlook®, a Lotus® server, and the like. Calendaring system 130 further comprises calendar event 131. Calendar event 131 can be any event in a calendar, such as a meeting event, an audio conference event, a video conference event, an event to call a person, and the like. Calendaring system 130 is shown separate from communication system 120; however calendaring system 130 can be part of communication system 120.

The user of communication device 101A places a request to establish an audio call (or a video call) to a user of communication device 101B. Communication manager 121 establishes the audio call between communication devices 101A and 101B. Once the audio call is established between communication devices 101A and 101B, the two users (participants) can communicate via the audio call. For a video call, the process would work in a similar manner, using the necessary communication protocols.

At this point, one of the participants wants to add an additional participant to the existing call. The participant using communication device 101A, via user interface 102, indicates that he/she wants to conference communication device 101C (an additional communication device) onto the call. Communication device 101A sends the call request to communication system 120. The call request to add communication device 101C to the call is received by communication manager 121.

During or prior to the establishment of the call to communication device 101C, information manager 122 keeps track of the participants in the call in order to generate a roster of all the participants on the call. How information manager 122 generates the roster can be done in various ways. For instance, information manager 122 can get the caller IDs or an Automatic Number Identification (ANI) for each communication device 101 when the call is established. Other ways to get the roster can include voice recognition, facial recognition, the participant speaking or entering their name, and the like. For example, if two participants are using communication device 101A, information manager can detect the two participants at the single communication device 101 using voice or facial recognition via the communication stream of the call. The detected participants are then added to the roster.

Communication manager 121 sends the call request to communication device 101C (the additional communication device) along with the roster of the plurality of participants. The roster does not necessarily have to be sent in the same packet and/or channel as the call request. Instead, the roster and the call request can be sent separately. The roster can be sent prior to or just after the call request. Communication device 101C receives the call request and the roster. Communication device 101C indicates that there is an incoming call and displays the roster via communication device 101C's user interface 102.

In addition to generating the roster, information manager 122 can optionally get information that describes the call or a participant on the call. For instance, information manager 122 can get a company that is associated with a participant and/or a title associated with a participant. Moreover information manager 122 can also get an indication of whether one or more of the participants prefer audio or video communication.

Information manager 122 can also send a list that identifies which of the participants are associated with one particular group and which of the participants are not associated with the one particular group. For example, if the call is a conference call where there are 5 participants from Company A and 2 participants from Company B, the list can indicate which participants are from Company A and which participants are from Company B.

In addition to sending the roster, information manager 122 can also get information associated with the call and send this information along with or in addition to the roster. Information manager 122 can get additional information such as the name of a presenter on the call. This can be gathered from documents such as an agenda or from calendar event 131 in calendaring system 130. For instance, information manager 122 can determine that the original call that was established is part of a conference call. Information manager 122 can get information from calendaring system 130 by getting information associated with the call from calendar event 131. Information manager can also get other information from calendar event 131, such as associated documents, audio files/clips, recorded messages, a copy of the calendar event 131, and the like. In addition, this information can include a description of the call and/or an agenda of the call. Other information can include information about who is currently speaking on the call, a link to a web conference, a copy of an invite to the call, a document, a ring tone, and the like. In addition, one of skill in the art would recognize that other types of information can be sent.

In an exemplary embodiment, the incoming roster and information could indicate that the call is from Sally Smith and Bob Johnson to discuss project XYZ. This way, not only does the caller know who is calling, but also knows the reason they are calling. The additional information along with the roster allows the caller to further screen the call.

Figure 2:
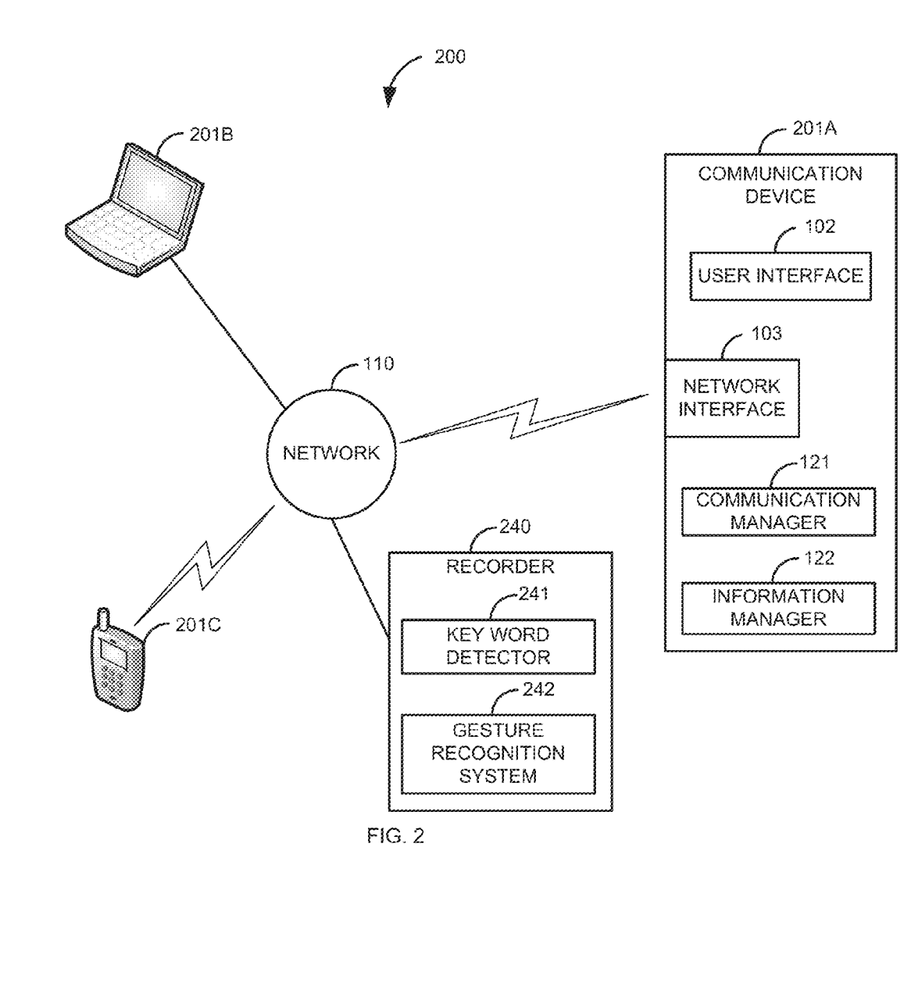
FIG. 2 is a block diagram of a second illustrative system for providing a roster and other information before joining a participant to a call.

FIG. 2 is a block diagram of a second illustrative system 200 for providing a roster and other information before joining a participant to a call. The second illustrative system 200 is shown as a peer-to-peer network 110 where communication devices 201A and 201B-201C communicate directly with each other to establish a call. The second illustrative network 200 can be a Session Initiation Protocol (SIP) network, or any type of peer-to-peer network, such as those used by Skype® for video communications. The second illustrative system 200 comprises communication devices 201A-201C, network 110, and recorder 240.

In this exemplary embodiment, communication device 201A comprises user interface 102, network interface 103, communication manager 121, and information manager 122. Communication devices 201B-201C can also comprise user interface 102, network interface 103, communication manager 121, and information manager 122.

Recorder 240 can be any hardware/software that can record a communication, such as an audio or video communication. Recorder 240 is shown separate from a communication device 201; however, recorder 240 can be part of communication of communication device 201. In this illustrative embodiment, recorder 240 is a communication device 201 that can participate in an audio or video call.

Recorder 240 further comprises key word detector 241 and gesture recognition system 242. Key word detector 241 can be any hardware/software that can detect key words out of an audio stream. Gesture recognition system 242 can be any hardware/software that can detect gestures by participants in a video conference. Key word detector and gesture recognition system 242 are shown as part of recorder 240. However, key word detector and gesture recognition system 242 can be separate from recorder 240.

The user of communication device 201A places a request to establish a video call (or audio call) to a user of communication device 201B. Communication manager 121 establishes the video call between communication devices 201A and 201B. Once the video call is established between communication devices 201A and 201B, the two users (participants) of communication devices 201A-201B can communicate via the video call.

The participant using communication device 201A, via user interface 102, indicates that he/she wants to conference communication device 201C onto the call. Communication device 201A via communication manager 121 sends a call request to communication device 201C. During or prior to the establishment of the call to communication device 201C, information manager 122 generates the roster of the participants on the call. Communication device 201C receives the call request and the roster. Communication device 201C indicates that there is an incoming call and displays the roster via communication device 201C's user interface 102.

In another exemplary embodiment, recorder 240 is a participant on the call. A participant can be inanimate object, such as recorder 240, key word detector 241, gesture recognition system 242, or any process/hardware that can analyze, record, or monitor a call. Like previously described, a call is established between communication devices 201A and 201B. One of the participants in the call wants to record the call and creates a conference call that now includes communication devices 201A, 201B, and recorder 240.

The participant using communication device 201B, via user interface 102, indicates that he/she wants to conference communication device 201C onto the call. Communication device 201B via communication manager 121 sends a call request to communication device 201C. During or prior to the establishment of the call to communication device 201C, information manager 122 generates the roster of the participants on the call. In this example, the roster includes the participants on the call at communication devices 201A and 201B. In addition, the roster includes recorder 240.

Communication manager 121 then sends the call request to communication device 101C (the additional communication device) along with the roster of the plurality of participants. Communication device 201C receives the call request and the roster. Communication device 201C indicates that there is an incoming call and displays the roster via communication device 201C's user interface 102. In addition to the participants on the call being displayed, an indication that recorder 240 is also on the call is displayed to the user of communication device 201C.

In addition to a roster that displays that recorder 240 is a participant in the call, other types of inanimate participants, such as key word detector 241 and/or gesture recognition system 242, can be sent as part of the roster (if key word detector 241 and/or gesture recognition system 242 are monitoring the call). By identifying these types of inanimate participants, the called party can further screen an incoming call.

Figure 3:
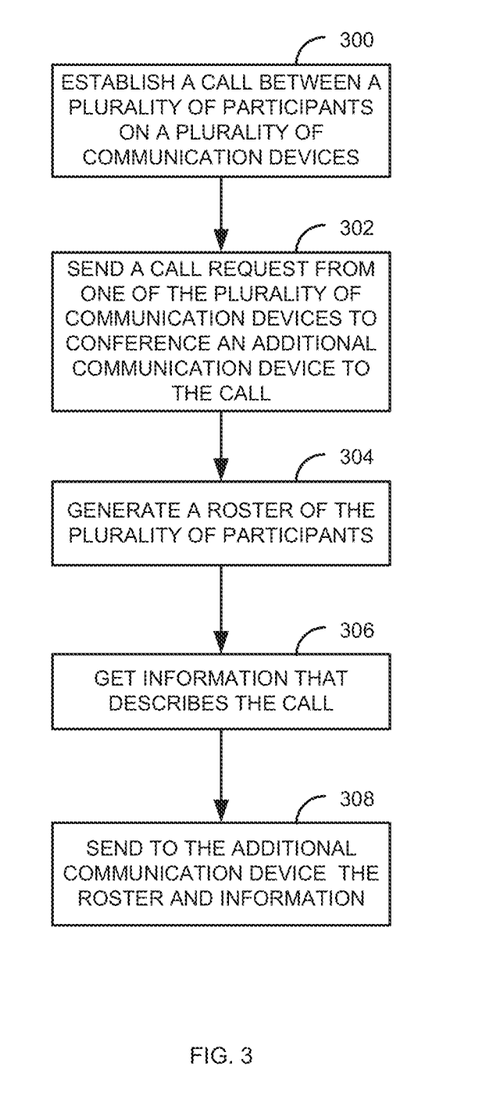
FIG. 3 is a flow diagram of a method for providing a roster and other information before joining a participant to a call.

FIG. 3 is a flow diagram of a method for providing a roster and other information before joining a participant to a call. Illustratively, communication devices 101, 201, communication system 120, communication manager 121, information manager 122, calendaring system 130, and recorder 240, key word detector 241, and gesture recognition system 242 are stored-program-controlled entities, such as a computer or processor, which perform the method of FIGS. 3-5 and the processes described herein by executing program instructions stored in a tangible computer readable storage medium, such as a memory or disk.

The process begins in step 300 when a call is established between two or more (a plurality) participants on two or more communication devices (101, 201). A call request is sent 302 from one of the communication devices (101, 201) to conference an additional communication device (101, 201) onto the call.

Information manager 122 generates 304 a roster of the plurality of participants. Different participants can be identified differently by information manager. For example, one participant may be identified using caller ID and another participant can be identified using voice or facial recognition. The system may not be able to identify a specific participant and may only identify the participant as unknown or not identified. The process may not identify a specific participant for various reasons, such as based on a user profile or for security reasons.

Information manager 122 can also get 306, information associated with the call. For example, the information can be a description of the call, or a specific ring tone that the additional communication device (101, 201) uses to ring based on the call request. Communication manager 121 sends 308 the roster and the information to the additional communication device (101, 201). At this point, the additional communication device (101, 201) can answer the incoming call based on whether the user decides to answer the incoming call.

Figure 4:
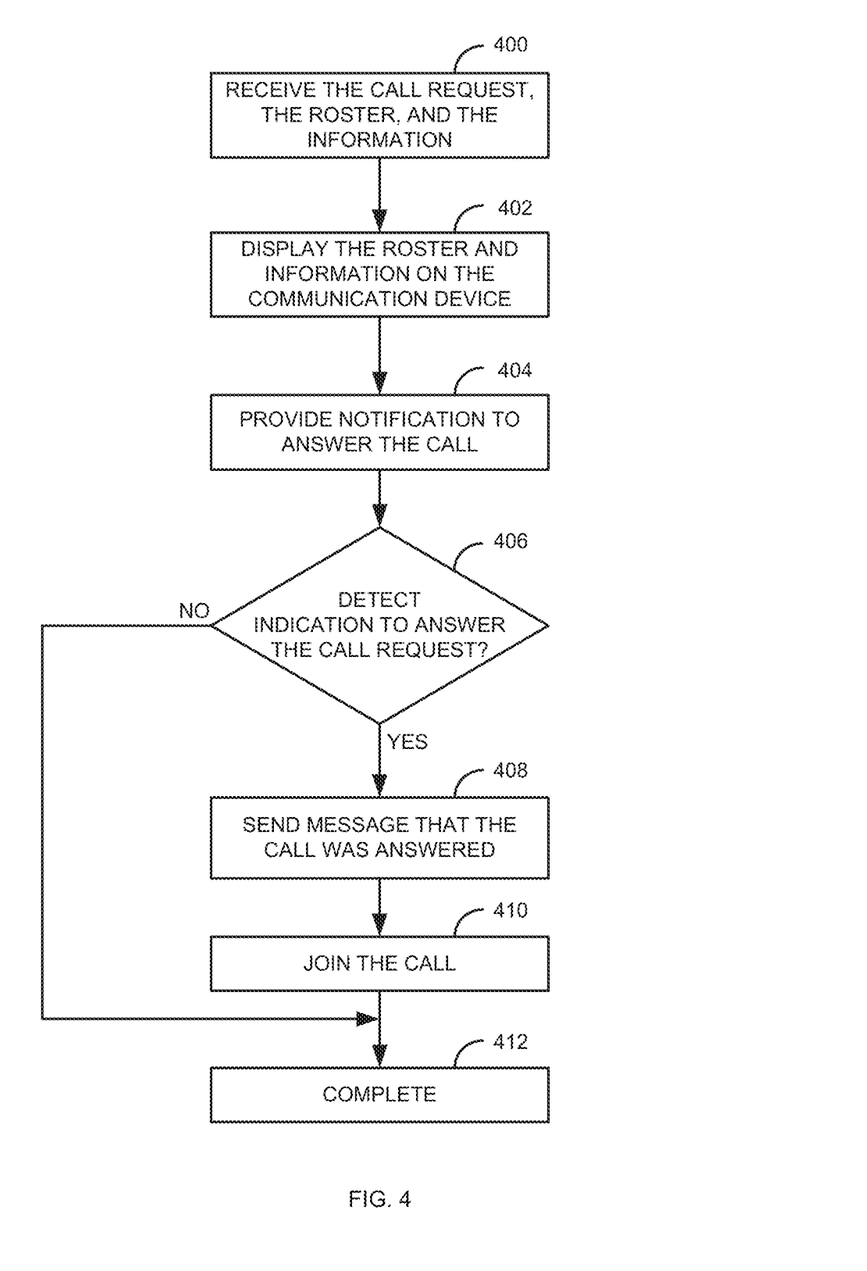
FIG. 4 is a flow diagram of a method receiving a roster and other information at a communication device before joining a call.

FIG. 4 is a flow diagram of a method receiving a roster and other information at communication device (101, 201) before joining a call. FIG. 4 is described from the additional communication device's (101, 201) perspective. The process begins after the call request (step 302), roster, and information are sent (step 308). The additional communication device (101, 201) receives 400 at network interface 103, the call request (sent in step 302), the roster, and the information (sent in step 308). The additional communication device (101, 201) displays 402, via user interface 102, the roster and the information.

A notification is provided 404 in user interface 102 to answer the call request. If user interface 102 detects an indication to answer the call request in step 406, a message that the call was answered is sent 408 to the communication device (101, 201) or communication system 120 that sent the call request. The additional communication device then joins 410 the call and the process is complete 412. If user interface 102 does not detect an indication to answer the call in step 406, the process is complete 412.

Figure 5:
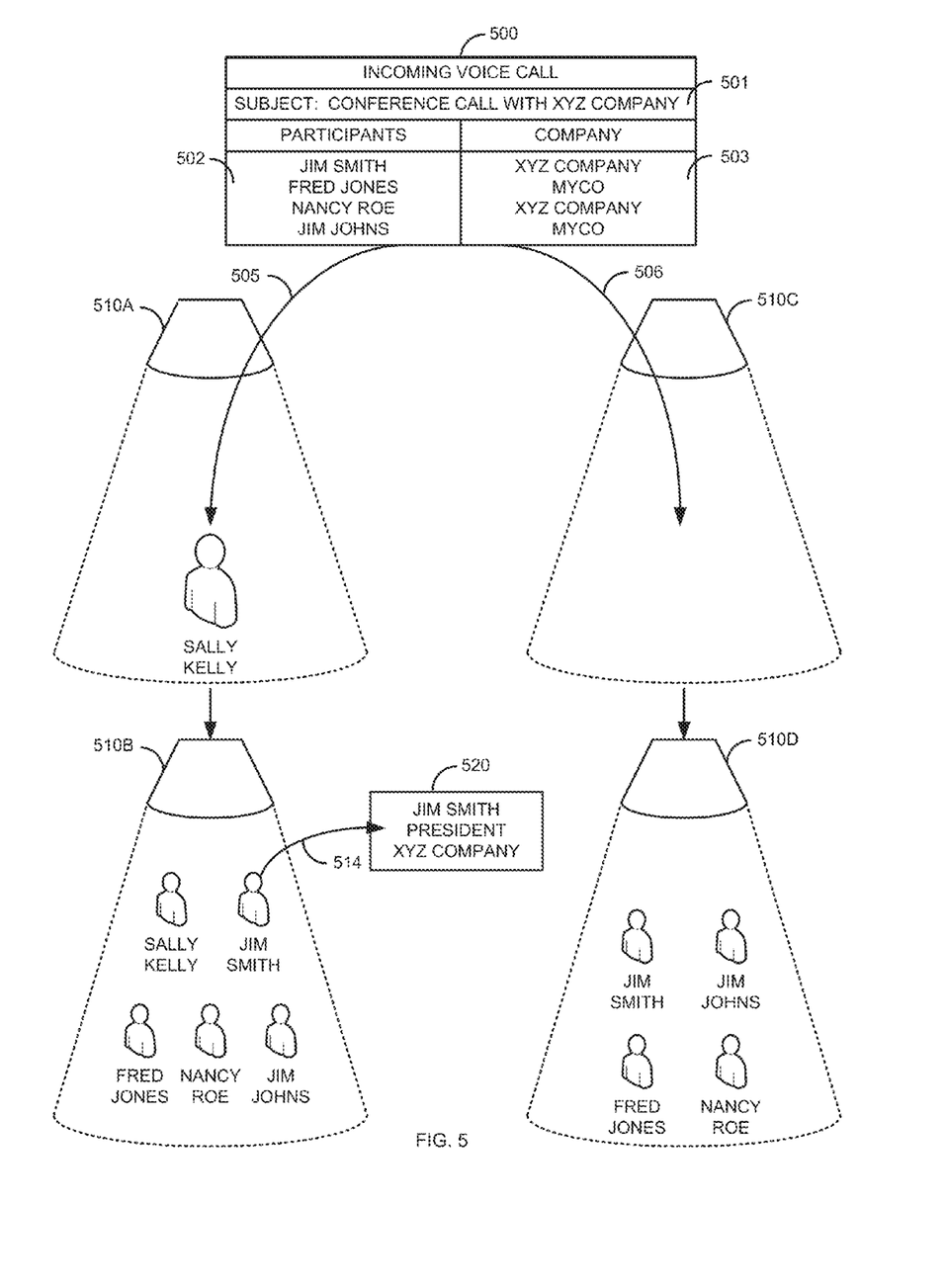
FIG. 5 is a diagram of an exemplary user interface for joining a participant to an existing call.

FIG. 5 is a diagram of an exemplary user interface 102 for joining a participant to an existing call. User interface 102 comprises roster list 500, call metaphors 510A-510D, and information window 520. Roster list 500 can be any graphical indicator that indicates an incoming call. Roster list 500 can also be in the form of an icon. This exemplary roster list 500 further comprises information associated with the call 501, a roster of the call participants 502, and a list that identifies which of the call participants are associated with a group and which are not associated with a group 503. In this illustrative embodiment, the list that identifies which of the call participants are associated with a group 503 is based on which of the call participants work for a specific company. One group works in XYZ Company and the other group works in MYCO. Other examples of groups could include membership in an organization, people in an area, or any other way of grouping participants in a call.

FIG. 5 shows four different call metaphors (510A-510D). Call metaphors 510A-510D show different states of a call metaphor 510. In this exemplary embodiment, metaphor 510 is a spotlight metaphor that show participants who are on a call with the exception of the user of the additional communication device (101, 201). However, in other embodiments, the user of the additional communication device (101, 201) could also be shown. Typically, user interface 102 will only contain a single call metaphor 510. In this illustrative example, the call metaphors 510A-510D are shown to illustrate how call metaphor 510 changes through the progression of receiving and accepting an incoming call request. As recognized by one of skill in the art, the illustrated call metaphor 510 is one of many ways that a call progression can be represented in user interface 102.

When the additional communication device (101, 201) receives the roster of participants and information associated with the call, user interface 102 displays roster list 500. In this example, the roster of the call participants 502 includes four participants (Jim Smith, Fred Jones, Nancy Roe, and Jim Johns), which are taken from the received roster of participants (sent in step 308). Likewise, the received information associated with the call 501 (sent in step 308) is displayed in roster list 500. If no additional information is sent, roster list 500 may only display the roster of call participants 502.

The user can indicate that he/she is answering the call by dragging-and-dropping 505 the roster list onto the call metaphor 510A. Call metaphor 510A shows that the user of the additional communication device (101, 201) is on an existing call with Sally Kelly. When the user drags-n-drops 505 roster list 500 onto call metaphor 510A, this results in a conference call that includes the four participants in the roster of call participants 502, Sally Kelly, and the user of the additional communication device (101, 201) as shown in call metaphor 510B.

Alternatively the user can indicate that he/she is answering the call by selecting individual participants from the roster of participants. For example, the user could highlight participants Jim Smith and Fred Jones and drag-n-drop the displayed roster list 500 into call metaphor 510A to create a conference with Sally Kelly, Jim Smith, and Fred Jones.

In a similar manner, the user can drag-n-drop 506 roster list 500 onto call metaphor 510C. Call metaphor 510C shows that there is not an existing call (no participants are shown in call metaphor 510C). When the user drags-n-drops 506 roster list 500 onto call metaphor 510C, the user accepts the call and a conference call is established with the four participants in the roster of call participants 502 and the user of the additional communication device (101, 201) as shown in call metaphor 510D.

The user can select a participant in call metaphor 510. For example, the user could select 514 (e.g., by right clicking on) participant Jim Smith in call metaphor 510B. This results in the display of information window 520. In this example, information window 520 displays that Jim Smith is the president of XYZ Company. The information displayed in information window 520 can be additional information that describes the call that is sent in step 308. The information displayed in information window 520 can be displayed using different colors, icons, titles, tooltips and the like as the cursor hovers over a participant.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for establishing calls comprising:
    establishing, from a communication manager, a call between a plurality of participants associated with a plurality of communication devices;
    sending, from the communication manager, a call request from one of the plurality of communication devices to conference an additional communication device to the call;
    generating, at an information manager, a roster of the plurality of participants;
    sending, from the communication manager, the call request and the roster of the plurality of participants to the additional communication device;
    receiving the call request and the roster of the plurality of participants at the additional communication device;
    displaying the roster on the additional communication device; and
    detecting, at the additional communication device, an indication to answer the call request, wherein the indication to answer the call request comprises a drag and drop of the roster icon or the list onto a call metaphor representing an existing call or a call acceptance.

2. The method of claim 1, further comprising the steps of obtaining information associated with the call, and sending the information associated with the call.

3. The method of claim 2, wherein the information associated with the call comprises at least one of the following: a name of a presenter on the call, a description of the call, an agenda of the call, a currently speaking participant on the call, a recorded message, a link to a web conference, a copy of an invite to the call, a document, and a ring tone.

4. The method of claim 2, wherein the obtaining step comprises obtaining the information associated with the call from a calendar event in a calendaring system.

5. The method of claim 1, wherein the roster further comprises additional information about at least one of the plurality of participants and wherein the additional information about the at least one of the plurality of participants is at least one of the following: an associated company, a title, and an indication of whether the at least one of the plurality of participants prefers audio or video communication.

6. The method of claim 1, wherein at least one of the plurality of participants is at least one of: a recorder, a key word detector, and a gesture recognition system.

7. The method of claim 1, wherein the roster further comprises a list identifying which of the plurality of participants are associated with one group, and which of the plurality of participants are not associated with the one group.

8. The method of claim 1, further comprising the steps of:
    sending from the additional communication device, a message that indicates that the call was answered; and
    joining the call.

9. An apparatus for establishing calls comprising:
    a communication manager configured to establish a call between a plurality of participants associated with a plurality of communication devices, send a call request to conference an additional communication device onto the call, and send a roster of the plurality of participants in conjunction with the call request to the additional communication device; and
    an information manager configured to generate the roster of the plurality of participants;
    wherein the additional communication device is configured to receive the call request and the roster of the plurality of participants, display the roster, and detect an indication to answer the call request, wherein the indication to answer the call request comprises a drag and drop of the roster icon or the list onto a call metaphor representing an existing call or a call acceptance.

10. The apparatus of claim 9, wherein the information manager is further configured to get information associated with the call and send the information associated with the call.

11. The apparatus of claim 10, wherein the information associated with the call comprises at least one of the following: a name of a presenter of the call, a description of the call, an agenda of the call, a currently speaking participant, a recorded message, a link to a web conference, a copy of a an invite to the conference, a document, and a specific ring tone.

12. The apparatus of claim 10, wherein the information manager is further configured to get the information associated with the call from a calendar event in a calendaring system.

13. The apparatus of claim 9, wherein the roster further comprises additional information about at least one of the plurality of participants and wherein the additional information about the at least one of the plurality of participants is at least one of the following: an associated company, a title, and an indication of whether the at least one of the plurality of participants prefers audio or video communication.

14. The apparatus of claim 9, wherein at least one of the plurality of participants is at least one of: a recorder, a key word detector, and a gesture recognition system.

15. The apparatus of claim 9, wherein the roster further comprises a list identifying which of the plurality of participants are associated with one group and which of the plurality of participants are not associated with the one group.

16. The apparatus of claim 9, wherein the additional communication device is configured to:
    send a message that indicates that the call was answered, and
    join the call.

17. A communication device comprising:
    a network interface configured to receive a call request to join a call between a plurality of participants associated with a plurality of communication devices, receive a roster of the plurality of participants associated with the call, send a message indicating that the call was answered in response to detecting an indication by a user to answer the call, and join the call; and
    a user interface configured to display the roster, provide a notification to answer the call, and detect the indication by the user to answer the call request, wherein the roster is displayed as a roster icon or as a list in the user interface and the indication by the user to answer the call request comprises a drag and drop of the roster icon or the list onto a call metaphor representing an existing call or a call acceptance.

18. The communication device of claim 17, wherein the network interface is further configured to receive information associated with the call and the user interface is further configured to display the information associated with the call.

19. The communication device of claim 17, wherein the roster further comprises a list identifying which of the plurality of participants are associated with one group and which of the plurality of participants are not associated with the one group.

* * * * *

UNITED STATES PATENT AND TRADEMARK OFFICE
CERTIFICATE OF CORRECTION

PATENT NO.        : 8,718,246 B2
APPLICATION NO.   : 13/355113
DATED             : May 6, 2014
INVENTOR(S)       : Frank Roessler et al.

It is certified that error appears in the above-identified patent and that said Letters Patent is hereby corrected as shown below:

In the Claims

Column 10, Line 15, Claim 11; delete "copy of a an" and add "copy of an"

Signed and Sealed this
Fifteenth Day of September, 2015

Michelle K. Lee
*Director of the United States Patent and Trademark Office*